(12) United States Patent
Paaske et al.

(10) Patent No.: US 10,114,956 B1
(45) Date of Patent: *Oct. 30, 2018

(54) SECURE PUBLIC KEY ACCELERATION

(71) Applicant: Apple Inc., Cupertino, CA (US)

(72) Inventors: Timothy R. Paaske, Cupertino, CA (US); Mitchell D. Adler, Los Gatos, CA (US); Conrad Sauerwald, Mountain View, CA (US); Fabrice L. Gautier, San Jose, CA (US); Shu-Yi Yu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/860,314

(22) Filed: Jan. 2, 2018

Related U.S. Application Data

(63) Continuation of application No. 15/372,697, filed on Dec. 8, 2016, now Pat. No. 9,892,267, which is a continuation of application No. 14/498,820, filed on Sep. 26, 2014, now Pat. No. 9,547,778.

(51) Int. Cl.
*G06F 21/60* (2013.01)
*G06F 21/62* (2013.01)

(52) U.S. Cl.
CPC ........ *G06F 21/602* (2013.01); *G06F 21/6218* (2013.01)

(58) Field of Classification Search
CPC ............. H04L 63/0853; H04L 63/0861; H04L 9/3231; H04L 2209/42; H04L 2209/56; H04L 29/06809; H04L 9/00; H04L 9/0866; H04L 9/3263; H04L 9/3278; H04W 12/06; H04W 4/80; H04W 84/18; G05B 19/054; G05B 19/00; G07C 2009/00095; G07C 9/00087; G06F 21/00; G06F 21/32;
(Continued)

(56) References Cited

U.S. PATENT DOCUMENTS

| 5,737,240 | A | 4/1998 | Ellsworth et al. |
| 6,417,965 | B1 | 7/2002 | Ye |
| 6,477,251 | B1 | 11/2002 | Szrek |

(Continued)

OTHER PUBLICATIONS

Final Office Action dated Feb. 14, 2014, in U.S. Appl. No. 13/626,566; 15 pages.

(Continued)

*Primary Examiner* — Abiy Getachew
(74) *Attorney, Agent, or Firm* — Meyertons, Hood, Kivlin, Kowert & Goetzel, P.C.; Lawrence J. Merkel

(57) ABSTRACT

In an embodiment, a system is provided in which the private key is managed in hardware and is not visible to software. The system may provide hardware support for public key generation, digital signature generation, encryption/decryption, and large random prime number generation without revealing the private key to software. The private key may thus be more secure than software-based versions. In an embodiment, the private key and the hardware that has access to the private key may be integrated onto the same semiconductor substrate as an integrated circuit (e.g. a system on a chip (SOC)). The private key may not be available outside of the integrated circuit, and thus a nefarious third party faces high hurdles in attempting to obtain the private key.

20 Claims, 8 Drawing Sheets

(58) Field of Classification Search
CPC .......... G06F 21/6254; G06Q 20/38215; H03K 19/003; H04N 1/442; H04N 21/4415
See application file for complete search history.

(56) References Cited

U.S. PATENT DOCUMENTS

| | | | |
|---|---|---|---|
| 6,601,133 B2 | 7/2003 | Zakai et al. | |
| 6,704,871 B1 | 3/2004 | Kaplan et al. | |
| 6,961,791 B2 | 11/2005 | Cepulis | |
| 7,043,616 B1 | 5/2006 | McGrath | |
| 7,082,507 B1 | 7/2006 | Christie et al. | |
| 7,130,951 B1 | 10/2006 | Christie et al. | |
| 7,130,977 B1 | 10/2006 | Christie et al. | |
| 7,146,477 B1 | 12/2006 | Strongin et al. | |
| 7,165,135 B1 | 1/2007 | Christie et al. | |
| 7,210,009 B2 | 4/2007 | Gulick et al. | |
| 7,334,123 B2 | 2/2008 | Gulick et al. | |
| 7,401,223 B2 | 7/2008 | Walmsley | |
| 7,401,358 B1 | 7/2008 | Christie et al. | |
| 7,493,498 B1 | 2/2009 | Schmidt et al. | |
| 7,496,966 B1 | 2/2009 | McGrath et al. | |
| 7,543,158 B2 | 6/2009 | Goss | |
| 7,603,550 B2 | 10/2009 | McGrath et al. | |
| 7,603,551 B2 | 10/2009 | McGrath et al. | |
| 7,865,733 B2 | 1/2011 | Goto et al. | |
| 7,937,757 B2 | 5/2011 | Focke et al. | |
| 8,417,965 B1* | 4/2013 | Sundararajan | H04L 9/0825 380/30 |
| 8,543,838 B1 | 9/2013 | Au et al. | |
| 8,615,799 B2 | 12/2013 | Henry et al. | |
| 8,627,032 B2 | 1/2014 | Zbiciak | |
| 8,645,716 B1 | 2/2014 | Dujari et al. | |
| 8,775,757 B2 | 7/2014 | Polzin | |
| 8,832,465 B2 | 9/2014 | Gulati et al. | |
| 8,873,747 B2 | 10/2014 | Polzin et al. | |
| 9,043,632 B2 | 5/2015 | Machnicki et al. | |
| 9,047,471 B2 | 6/2015 | Polzin et al. | |
| 9,547,778 B1 | 1/2017 | Paaske et al. | |
| 9,892,267 B1 | 2/2018 | Paaske et al. | |
| 2001/0047452 A1 | 11/2001 | Okada et al. | |
| 2002/0021804 A1 | 2/2002 | Ledzius | |
| 2002/0073316 A1 | 6/2002 | Collins | |
| 2003/0074571 A1 | 4/2003 | Fujiwara et al. | |
| 2004/0068644 A1 | 4/2004 | Hutton et al. | |
| 2004/0179718 A1* | 9/2004 | Chou | G07C 9/00087 382/115 |
| 2004/0257898 A1 | 12/2004 | Ozawa et al. | |
| 2006/0143396 A1 | 6/2006 | Cabot | |
| 2006/0291304 A1 | 12/2006 | Rothman et al. | |
| 2007/0209072 A1 | 9/2007 | Chen | |
| 2007/0239977 A1 | 10/2007 | Wu | |
| 2007/0260867 A1 | 11/2007 | Ethier et al. | |
| 2007/0260869 A1 | 11/2007 | Dade et al. | |
| 2008/0052534 A1 | 2/2008 | Harada et al. | |
| 2008/0162848 A1 | 7/2008 | Broyles et al. | |
| 2008/0183968 A1 | 7/2008 | Huang | |
| 2008/0222428 A1 | 9/2008 | Dellow | |
| 2009/0172379 A1 | 7/2009 | Rothman et al. | |
| 2009/0222653 A1 | 9/2009 | Findelsen et al. | |
| 2009/0222915 A1 | 9/2009 | Challener et al. | |
| 2009/0249098 A1 | 10/2009 | Han et al. | |
| 2010/0042858 A1 | 2/2010 | Padhye et al. | |
| 2010/0098248 A1 | 4/2010 | Anantharaman | |
| 2012/0042157 A1 | 2/2012 | Leclercq | |
| 2012/0042175 A1 | 2/2012 | Lin et al. | |
| 2012/0272027 A1 | 10/2012 | Zbiciak | |
| 2012/0303941 A1 | 11/2012 | Grieco et al. | |
| 2013/0159726 A1 | 6/2013 | McKeen et al. | |
| 2013/0346758 A1 | 12/2013 | LaMacchia et al. | |
| 2014/0089650 A1 | 3/2014 | Polzin et al. | |
| 2014/0089712 A1 | 3/2014 | Machnicki et al. | |
| 2014/0281616 A1 | 9/2014 | Moran et al. | |
| 2015/0010148 A1 | 1/2015 | Polzin et al. | |

OTHER PUBLICATIONS

Intel® Trusted Execution Technology, Software Development Guide, Measured Launched Environment Developer's Guide, Mar. 2011, 112 pages, Intel Coproration.

Building a Secure System using Trustzone® Technology, Apr. 2009, 108 pages, Issue C, ARM Limited.

TCG Mobile Trusted Module Specification, Apr. 29, 2010, 103 pages, Specification Version 1.0, Revision, 7.02, Trusted Computing Group, Incorporated.

TPM Main, Part 1 Design Principles, Mar. 1, 2011, 184 Pages, Specification Version 1.2, Revision 116, Trusted Computer Group, Incorporated.

TPM Main, Part 2 TPM Structures, Mar. 1, 2011, 202 pages, Specification Version 1.2, Level 2, Revision 116, Trusted Computing Group, Incorporated.

TPM Main, Part 3 Commands, Mar. 1, 2011, 339 pages, Specification Version 1.2, Level 2, Revision 116, Trusted Computing Group, Incorporated.

James Greene, Intel® Trusted Execution Technology,Hardware-based Technology for Enhancing Server Platform Security, 2010, 8 pages, Intel Corporation, United States.

Jim Alves-Foss et al; "The MILS Architecture for High-Assurance Embedded Systems", International Journal of Embedded Systems, Feb. 2005, 9 pages, Inderscience Publishers.

Office Action from U.S. Appl. No. 13/626,585, dated Jan. 20, 2015, pp. 1-11.

Non-Final Office Action, U.S. Appl. No. 14/696,622, dated Jun. 5, 2015, 12 pages.

Office Action from U.S. Appl. No. 14/493,458, dated Oct. 8, 2015, pp. 1-6.

Office Action from U.S. Appl. No. 14/493,458, dated Dec. 9, 2015, pp. 1-10.

* cited by examiner

SECURE PUBLIC KEY ACCELERATION

This application is a continuation of U.S. patent application Ser. No. 15/372,697, filed Dec. 8, 2016 and now U.S. Pat. No. 9,892,267, which is a continuation of U.S. patent application Ser. No. 14/498,820, filed on Sep. 26, 2014, now U.S. Pat. No. 9,547,778. The above applications and patents are incorporated herein by reference in their entireties.

BACKGROUND

Technical Field

Embodiments described herein are related to hardware circuits for public key acceleration.

Description of the Related Art

A variety of open networks are being used for communication today, such as public wireless fidelity (WiFi) networks, Bluetooth connections, near field wireless communication, etc. On any of these communications media, the data being exchanged between two devices may be susceptible to capture by unauthorized third parties. Similarly, communications on large networks such as the Internet may be susceptible to observation/capture on the many devices over which the communications travel. Accordingly, the secure exchange of information has become an increasing priority. For example, the ability to perform financial transactions over the media or to transmit protected data such as copyrighted works over the media may be based on the secure exchange. Generally, the secure exchange may include the ability to identify oneself and to identify another party without easily permitting the mimicking of the other party, so that the parties can each verify that they are communicating with a legitimate counterpart. The secure exchange may also include the ability to ensure that only the other party may view the communication. The identify verification may be referred to as authentication (e.g. through such mechanisms as a digital signature), and the ability to control access to the communication is typically handled using encryption.

One mechanism for authenticating and providing encryption/decryption is public key cryptography. In this mechanism, each party has a pair of keys: a public key and a private key. The public key may be freely shared, and may be used to authenticate a digital signature from the owner and to encrypt data for the owner. The owner may maintain the private key in secrecy, and may use the private key to decrypt data encrypted with the public key and to generate the digital signature. Because the public key can be freely shared, it is relatively simple to arrange for secure exchange by simply exchanging public keys between the parties. For even more secure exchange, a shared secret can be generated using each party's public key and the other party's private key.

While public key cryptography system has many benefits in terms of simplicity, the secrecy of the private key is paramount. If the private key is compromised, the integrity of all communication to/from the owner of the private key becomes suspect. That is, the digital signatures from that owner may not be legitimate, and the data encrypted with that owner's public key may not be secure from third party viewing. Typically, the private key is generated in software on a device used by the user and is stored in the memory of that device. Accordingly, the private key is susceptible to being stolen/viewed by a third party in even the best of systems which attempt to hide the key.

SUMMARY

In an embodiment, a system is provided in which the private key is managed in hardware and is not visible to software. The system may provide hardware support for public key generation, digital signature generation, encryption/decryption, and large random prime number generation without revealing the private key to software. The private key may thus be more secure than software-based versions. In an embodiment, the private key and the hardware that has access to the private key may be integrated onto the same semiconductor substrate as an integrated circuit (e.g. a system on a chip (SOC)). The private key may not be available outside of the integrated circuit, and thus a nefarious third party faces high hurdles in attempting to obtain the private key.

The additional security provided by the system described herein may enhance the overall security of the system in various environments. Because the private key is more trusted to be secure, secure elements such as other systems (or other circuits within a system with the SOC) may grant more access (and thus more functionality) to the system. Various examples are described in more detail below.

BRIEF DESCRIPTION OF THE DRAWINGS

The following detailed description makes reference to the accompanying drawings, which are now briefly described.

Figure 1:
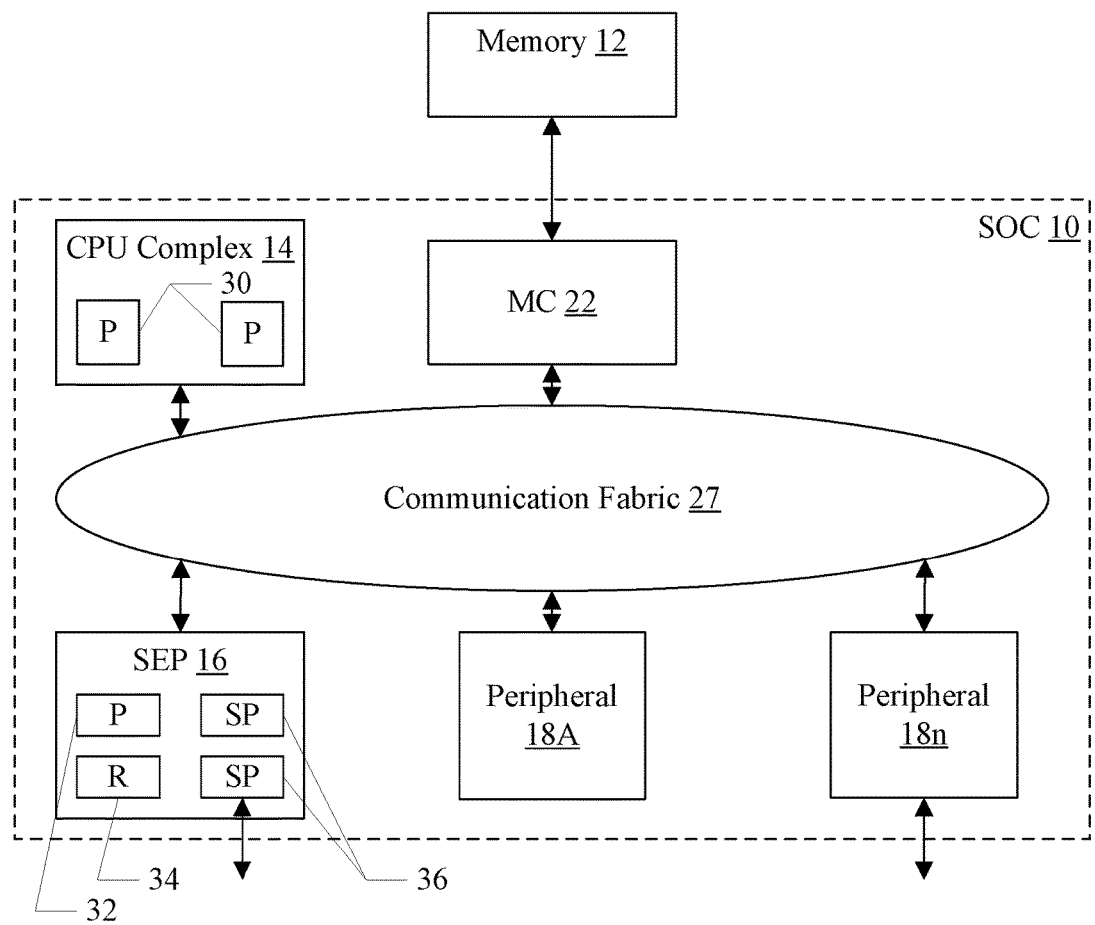
FIG. 1 is a block diagram of one embodiment of a system on a chip (SOC).

While the embodiments described herein are susceptible to various modifications and alternative forms, the embodiments are shown by way of example in the drawings and will be described in detail. It should be understood, however, that the drawings and detailed description thereto are not intended to limit this disclosure to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Turning now to FIG. 1, a block diagram of one embodiment of an SOC 10 is shown coupled to a memory 12. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a central processing unit (CPU) complex 14, peripheral components 18A-18n (more briefly, "peripherals 18" or "peripheral components 18"), a memory controller 22, a security enclave processor (SEP) 16, and a communication fabric 27. The components 14, 16, 18A-18n, and 22 may all be coupled to the communication fabric 27. The memory controller 22 may be coupled to the memory 12 during use. In the illustrated embodiment, the CPU complex 14 may include one or more processors (P 30 in FIG. 1). The processors 30 may form the CPU(s) of the SOC 10. In the illustrated embodiment, the SEP 16 includes one or more processors 32, a secure boot ROM 34, and one or more security peripherals 36. The processor(s) 30 may be referred to herein as CPU processor(s) 30, and the processor(s) 32 may be referred to herein as secure processor(s) 32 or SEP processor(s) 32.

The SEP 16 is an example of a security circuit or a secure component. Generally, a security circuit/secure component may be any circuitry that is configured to perform one or more secure services for the rest of the SOC 10 (e.g. the other components in the SOC 10). That is, a component may transmit a request for a secure service to the secure component, which may perform the secure service and return a result to the requestor. The result may be an indication of success/failure of the request and/or may include data generated by performing the service. For example, secure services may include various cryptographic services such as authentication, encryption, decryption, etc. The result of authentication may be a pass/fail, for example. The result of encryption/decryption may be the encrypted/decrypted data. Secure services may include secure key generation, where the keys may be used by components external to the secure component for various security functions such as encryption or authentication. The result of secure key generation may be the key.

More particularly, in an embodiment, the secure services may include public key operations based on a private key that is accessible within the SEP 16 by hardware, but not accessible by software. The software may be executed on the CPU processors 30, the SEP processor 32, or any other processors in the SOC 10 and the software still may not have access to the private key. By restricting the access to the private key to hardware circuits (and specifically to hardware circuits within the SEP 16, to which access is carefully controlled), secrecy of the private key may be enhanced. To obtain the private key, for example, a nefarious actor may be required to somehow carefully observe the hardware rather than find a way to break the software.

A secure component may include any desired circuitry (e.g. cryptographic hardware, hardware that accelerates certain operations that are used in cryptographic functions, etc.). A secure component need not include a processor. In some embodiments, e.g. the embodiment shown in FIG. 1, a processor is included. The SEP processor 32 may execute securely-loaded software. For example, a secure read-only memory (ROM) 34 may include software executable by the SEP processor 32. One more of the security peripherals 36 may have an external interface, which may be connected to a source of software (e.g. a non-volatile memory such as Flash memory). In another embodiment, the source of software may be a non-volatile memory coupled to another peripheral 18, and the software may be encrypted to avoid observation by a third party. The software from the source may be authenticated or otherwise verified as secure, and may be executable by the SEP processor 32. In some embodiments, software may be loaded into a trust zone in the memory 12 that is assigned to the SEP 16 and the SEP processor 32 may fetch the software from the trust zone for execution. The software may be stored in the memory 12 in encrypted form to avoid observation. Despite the steps taken to ensure security of the secure software, the secure software may still be prevented from directly accessing/obtaining the private key. Only hardware may have access to the private key, in an embodiment.

Secure services may include any services related to ensuring the protection of private data and/or preventing the unauthorized use of the device including the SOC 10. Protecting private data may include preventing unauthorized access (e.g. theft of data) and/or preventing corruption/destruction of the data. Protecting private data may include ensuring the integrity and confidentiality of the data, and the availability of the data to authorized access. Preventing unauthorized use may include, e.g., ensuring that a permitted use is paid for (e.g. network access by a portable device) and may also include ensuring that nefarious acts are prevented. Nefarious acts may include, for example, use of a device to consume power from a battery of the device so that authorized use is curtailed due to a lack of power, acts to cause damage to the system or to another system that interacts with the system, use of the device to cause corruption of data/software, etc. Secure services may include ensuring that the use of the system is available to authorized users as well, and authenticating authorized users.

The SEP 16 may be isolated from the rest of the SOC 10 except for a carefully-controlled interface (thus forming a secure enclave for the SEP processor 32, the secure boot ROM 34, and the security peripherals 36). Because the interface to the SEP 16 is carefully controlled, direct access to the SEP processor 32, the secure boot ROM 34, and the security peripherals 36 may be prevented. In one embodiment, a secure mailbox mechanism may be implemented. In the secure mailbox mechanism, external devices may transmit messages to an inbox. The SEP processor 32 may read and interpret the message, determining the actions to take in response to the message. Response messages from the SEP processor 32 may be transmitted through an outbox, which is also part of the secure mailbox mechanism. Other interfaces that permit only the passing of commands/requests from the external components and results to the external components may be used. No other access from the external devices to the SEP 16 may be permitted, and thus the SEP 16 may be "protected from access". More particularly, software executed anywhere outside the SEP 16 maybe prevented from direct access to the secure components with the SEP 16. The SEP processor 32 may determine whether or not a command is to be performed. In some cases, the determination of whether or not to perform the command may be affected by the source of the command. That is, a command may be permitted from one source but not from another.

The security peripherals 36 may be hardware configured to assist in the secure services performed by the SEP 16. For example, the security peripherals may include authentication hardware implementing/accelerating various authentication algorithms, encryption hardware configured to perform/ accelerate encryption, secure interface controllers configured to communicate over a secure interface to an external (to the SOC 10) device, etc.

As mentioned above, the CPU complex 14 may include one or more processors 30 that may serve as the CPU of the SOC 10. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors. The CPU complex 14 may further include other hardware such as an L2 cache and/or an interface to the other components of the system (e.g. an interface to the communication fabric 27).

Generally, a processor may include any circuitry and/or microcode configured to execute instructions defined in an instruction set architecture implemented by the processor. Processors may encompass processor cores implemented on an integrated circuit with other components as a system on a chip (SOC 10) or other levels of integration. Processors may further encompass discrete microprocessors, processor cores and/or microprocessors integrated into multichip module implementations, processors implemented as multiple integrated circuits, etc.

The memory controller 22 may generally include the circuitry for receiving memory operations from the other components of the SOC 10 and for accessing the memory 12 to complete the memory operations. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, DDR4, etc.) DRAM. Low power/ mobile versions of the DDR DRAM may be supported (e.g. LPDDR, mDDR, etc.). The memory controller 22 may include queues for memory operations, for ordering (and potentially reordering) the operations and presenting the operations to the memory 12. The memory controller 22 may further include data buffers to store write data awaiting write to memory and read data awaiting return to the source of the memory operation. In some embodiments, the memory controller 22 may include a memory cache to store recently accessed memory data. In SOC implementations, for example, the memory cache may reduce power consumption in the SOC by avoiding reaccess of data from the memory 12 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 22.

The peripherals 18A-18n may be any set of additional hardware functionality included in the SOC 10. For example, the peripherals 18A-18n may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include interface controllers for various interfaces external to the SOC 10 (e.g. the peripheral 18B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

It is noted that the number of components of the SOC 10 (and the number of subcomponents for those shown in FIG. 1, such as within the CPU complex 14 and the SEP 16) may vary from embodiment to embodiment. There may be more or fewer of each component/subcomponent than the number shown in FIG. 1.

Figure 2:
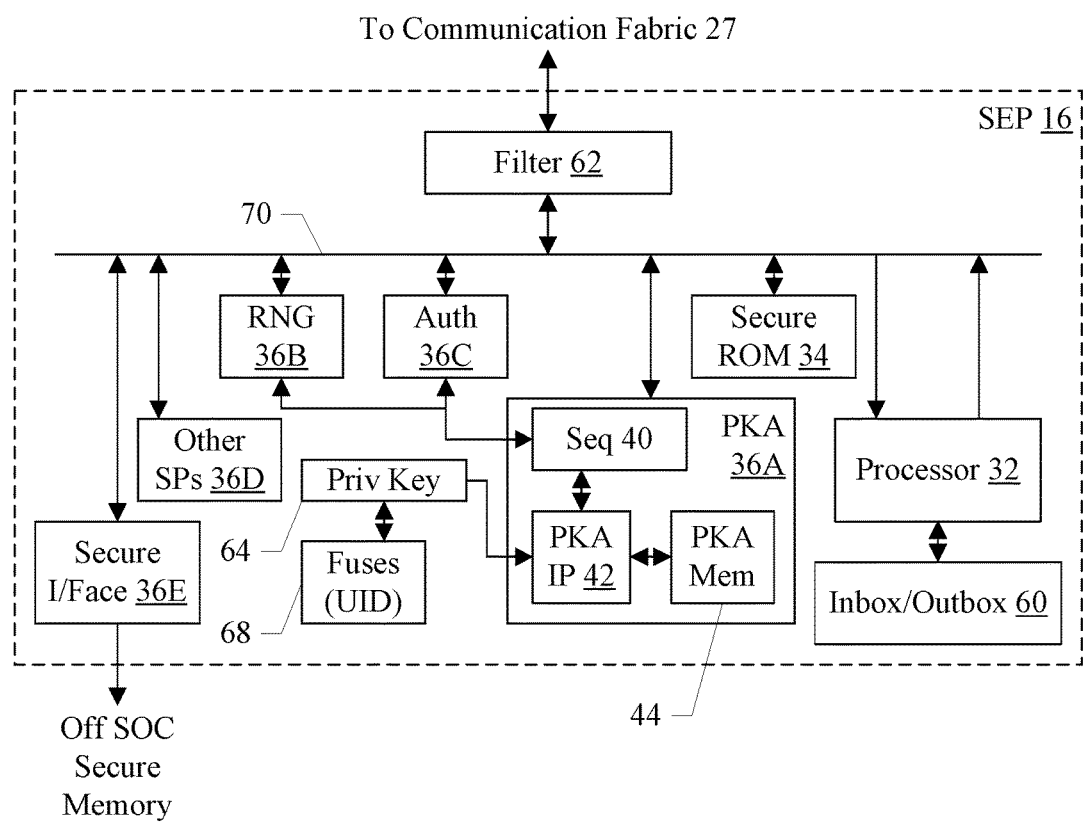
FIG. 2 is a block diagram of one embodiment of a security enclave processor (SEP).

Turning now to FIG. 2, a block diagram of one embodiment of the SEP 16 in greater detail is shown. In the illustrated embodiment, the SEP 16 includes the SEP processor 32, security peripherals 36A-36E, the secure ROM 34, secure mailbox 60, filter 62, a private key 64, and fuses 68. The filter 62 may be coupled to the communication fabric 27 and to a local interconnect 70 to which the other components of the SEP 16 are also coupled. Like the communication fabric 27, the local interconnect 70 may have any configuration (bus-based, packet-based, hierarchical, point-to-point, cross bar, etc.). The security peripheral 36A is public key accelerator (PKA) circuit and may be coupled to receive the private key 64. The private key 64 may be stored in the fuses 68, or may be generated from the data in the fuses 68 and/or other data, in various embodiments. In some embodiments, the PKA 36A may include a sequencer 40, a PKA intellectual property (IP) circuit 42, and a PKA memory 44. The sequencer 40 may be coupled to the interconnect 70, the secure peripherals 36B-36C, and the PKA IP circuit 42. The PKA IP circuit 42 may be coupled to receive the private key 64. The PKA IP circuit 42 may be coupled to the PKA memory 44. The SEP processor 32 is coupled to the secure mailbox 60.

The filter 62 may be configured to tightly control access to the SEP 16 to increase the isolation of the SEP 16 from the rest of the SOC 10, and thus the overall security of the SOC 10. More particularly, in an embodiment, the filter 62 may permit read/write operations from the communication fabric 27 to enter the SEP 16 only if the operations address the secure mailbox 60. Other operations may not progress from the fabric 27 into the SEP 16. Even more particularly, the filter 62 may permit write operations to the address assigned to the inbox portion of the secure mailbox 60, and read operations to the address assigned to the outbox portion of the secure mailbox 60. All other read/write operations may be prevented by the filter 62. In an embodiment, the filter 62 may respond to other read/write operations with an error. In an embodiment, the filter 62 may sink write data associated with a filtered write operation without passing the write data on to the local interconnect 70. In an embodiment, the filter 62 may supply nonce data as read data for a filtered read operation. Nonce data may generally be data that is not associated with the addressed resource within the SEP 16. Nonce data is sometimes referred to as "garbage data." The filter 62 may supply any data as nonce data (e.g. all zeros, all ones, random data from a random number generator, data programmed into the filter 62 to respond as read data, the address of the read transaction, etc.).

In an embodiment, the filter 62 may only filter incoming read/write operations. Thus, the components of the SEP 16 may have full access to the other components of the SOC 10 and the memory 12. Accordingly, the filter 62 may not filter responses from the fabric 27 that are provided in response to read/write operations issued by the SEP 16.

The secure mailbox 60 may include an inbox and an outbox. Both the inbox and the outbox may be first-in, first-out buffers (FIFOs) for data. The buffers may have any size (e.g. any number of entries, where each entry is capable of storing data from a read/write operation). Particularly, the inbox may be configured to store write data from write operations sourced from the fabric 27 (e.g. issued by one of the CPU processors 30). The outbox may store write data from write operations sourced by the processor 32 (which may be read by read operations sourced from the fabric 27, e.g. read operations issued by one of the CPU processors 30).

The secure ROM 34 is coupled to the local interconnect 70, and may respond to an address range assigned to the secure ROM 34 on the local interconnect 70. The address range may be hardwired, and the processor 32 may be hardwired to fetch from the address range at boot in order to boot from the secure ROM 34. The filter 62 may filter addresses within the address range assigned to the secure ROM 34 (as mentioned above), preventing access to the secure ROM 34 from external to the SEP 16. As mentioned previously, the secure ROM 34 may include the boot code for the SEP 16. Additionally, in some embodiments, the secure ROM 34 may include other software executed by the SEP processor 32 during use (e.g. the code to process inbox messages and generate outbox messages, code to interface to the security peripherals 36A-36E, etc.). In an embodiment, the secure ROM 34 may store all the code that is executed by the SEP processor 32 during use.

The SEP processor 32 may process commands received from various sources in the SOC 10 (e.g. from the CPU processors 30) and may use various secure peripherals to accomplish the commands. In the case of commands that involve the private key 64, the SEP processor 32 may provide the command to the PKA 36A (and more particularly to the sequencer 40). The sequencer 40 may include circuitry that decodes the command and generates a series of subcommands to implement the command. In an embodiment, the sequencer 40 may include a read-only memory (ROM) that stores sequences of subcommands for each command supported by the PKA 36A. Other embodiments may employ hardware decoding, or a combination of hardware decoding and ROM implementations.

The subcommands may include subcommands for the PKA IP circuit 42, which may perform operations that manipulate the private key 64 and optionally other operations. The subcommands may further include subcommands that are performed by other SPs 36. For example, in the illustrated embodiment, subcommands may be performed by the random number generator circuit 36B and the authentication circuit 36C. The sequencer 40 may be coupled to the SPs 36B-36C, and may arbitrate or otherwise coordinate access to the SPs 36B-36C with the processor 32.

The PKA IP circuit 42 may generate various intermediate results during operation and may write the results to the PKA memory 44. The PKA memory 44 may further include a ROM that may store command sequences and other information used by the PKA IP circuit 42. Accordingly, in some cases, the memory 44 may store the private key 64 or values derived from the private key 64. To further enhance security, each subcommand sequence from the sequencer 40 may include subcommands performed after the result is determined for a given command, to overwrite the memory locations in the memory 44 that were used during processing of the given command. Any data may be written. For example, in an embodiment, zeros may be written. Alternatively, ones may be written, or any other data pattern may be used. Different patterns may be written at different times.

Any set of commands to the PKA 36A may be supported. For example, in an embodiment, one or more of the following commands may be supported: public key extraction (with returns a public key corresponding to the private key 64), digital signature generation, digital hash, encryption, and decryption. In an embodiment, the public key extraction, digital signature generation, and digital hash may be elliptical-curve Diffie-Hellman operations. The encryption and decryption may be RSA encryption-based (where RSA is derived from the names of the developers: Ron Rivest, Adi Shamir, and Leonard Adleman). Each command may be sequenced into multiple subcommands for the PKA IP circuit 42, the authentication circuit 36C, and/or the random number generator 36B.

The authentication circuit 36C may implement an authentication algorithm. For example, the authentication circuit 36C may implement secure hash algorithms (SHA) such as SHA-1 or SHA-2, or any other authentication algorithms. The random number generator 36B may include any circuitry for generating a random or pseudo-random number. A source of randomness (e.g. temperature) may be used to improve the randomness of the generation. There may be various other security peripherals 36D.

In addition to security peripherals designed to perform specific functions, there may also be security peripherals that are interface units for secure interfaces such as the secure interface unit 36E. In the illustrated embodiment, the secure interface unit 36E may be an interface to an off SOC 10 ("off-chip") secure memory. For example, the interface may an interface to an off SOC Smart Card.

The security peripherals 36B-36E may have programming interfaces, which may be used by the SEP processor 32 (and more particularly by software executing on the SEP processor 32) to invoke the security peripherals 36B-36E to perform a particular task. For example, the peripherals may include register that may be read and written to control operation of the security peripherals. The peripherals may include a command interface that receives and interprets write operations as commands to be performed. Any interface for invoking the security peripherals may be used.

Figure 3:
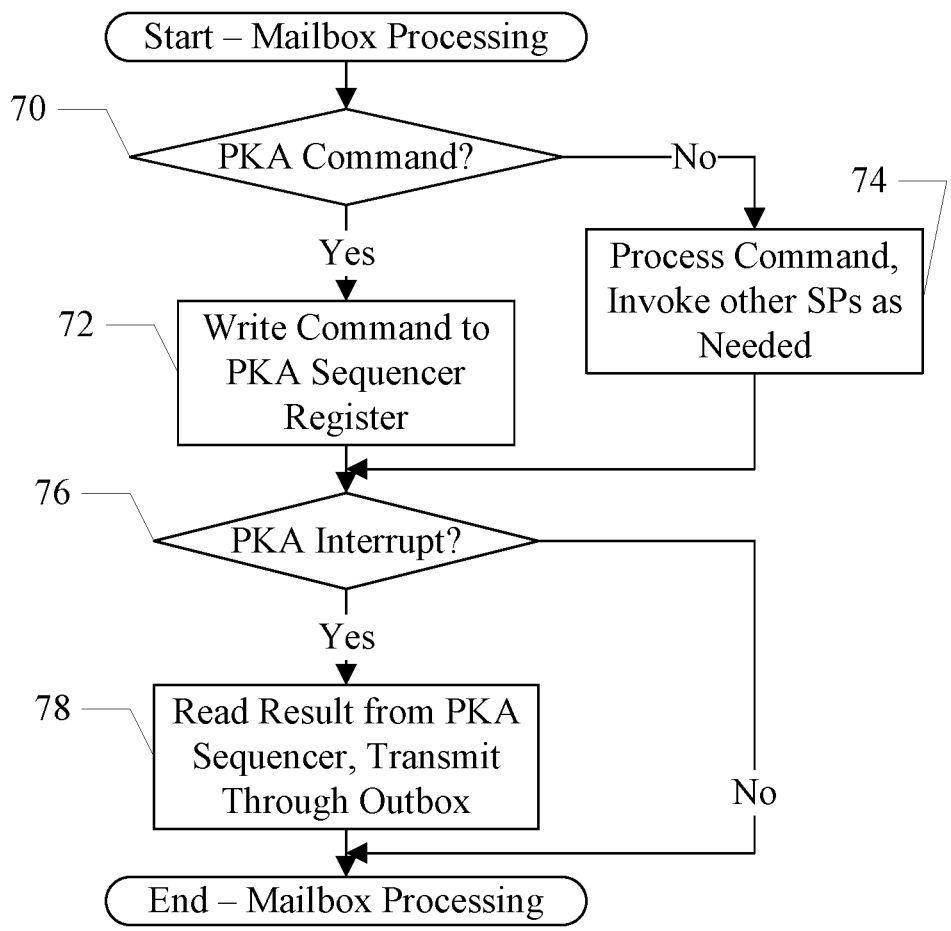
FIG. 3 is a flowchart illustrating operation of one embodiment of an SEP processor shown in FIG. 2.

Turning now to FIG. 3, a flowchart is shown illustrating operation of one embodiment of the SEP processor 32 executing code that processes secure mailbox messages and responds to PKA 36A interrupts. While the blocks are shown in a particular order for ease of understanding, other orders may be used. In particular, responding to the command and responding to the interrupt may be independent code sequences and may be executed independent of each other. Each code sequence may include instructions which, when executed on a processor such as the SEP processor 32, implement the operation described below.

In response to a message received in the secure inbox, the SEP processor 32 may process the message to determine the requested secure service. If the request involves the private key, it may be mapped to the PKA 36A (i.e. it may be a "PKA command"). If the command is a PKA command (decision block 70, "yes" leg), the SEP processor 32 may write the command to a register in the PKA sequencer 40. If the command is not a PKA command (decision block 70, "no" leg), the command may be processed by any combination of the SEP processor 32 and one or more of the other secure peripherals 36B-36E (block 74). Generally, the SEP processor 32 may also determine whether or not the command is to be performed at all within the SEP 16 (not shown in FIG. 3). If the command is not to be performed, the SEP processor 32 may terminate processing of that command. The SEP processor 32 may write a message to the source of the command in the outbox portion of the secure mailbox 60 to report the rejection.

In response to an interrupt from the PKA 36A (decision block 76, "yes" leg), the SEP processor 32 may read the result from the sequencer 40 (e.g. a register in the sequencer 40—block 78). Accordingly, the interaction between the PKA 36A and the SEP processor 32 may be restricted to register read and write operations in the sequencer 40. The SEP processor 32 may thus not be exposed to the private key 64. By contrast, the SEP processor 32 may generally have more access to other secure peripherals 36B-36E, reading and writing various registers and memory, if any.

Figure 4:
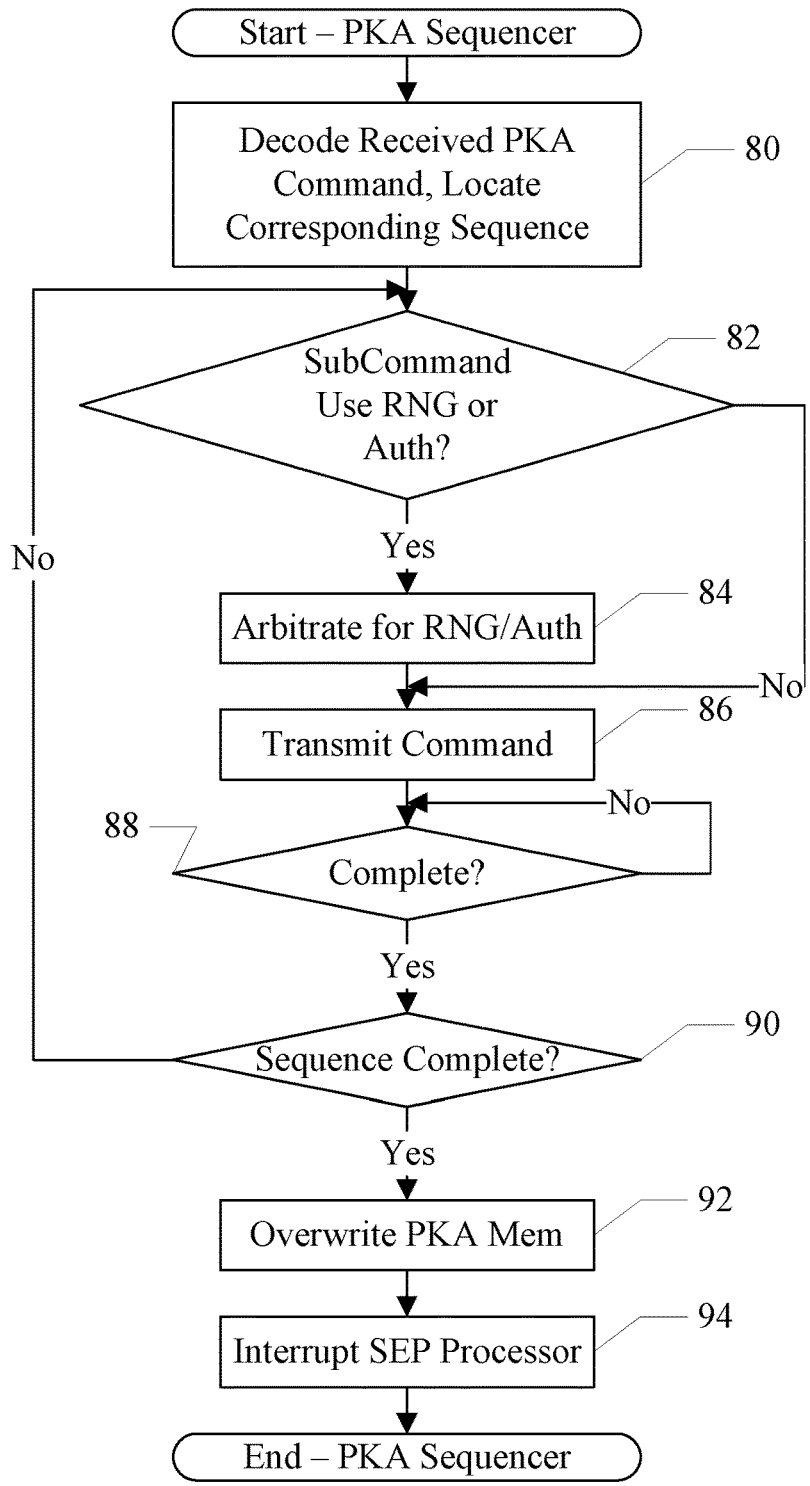
FIG. 4 is a flowchart illustrating operation of one embodiment of a public key accelerator (PKA) sequencer shown in FIG. 2.

FIG. 4 is a flowchart illustrating operation of one embodiment of the sequencer 40 in response to receiving a PKA command from the SEP processor 32. While the blocks are shown in a particular order for ease of understanding, other orders may be used. Blocks may be performed in parallel in combinatorial logic within the sequencer 40. Blocks, combinations of blocks, and/or the flow chart as a whole may be pipelined over multiple clock cycles. The sequencer 40 may be configured to perform the operation shown in FIG. 4.

The sequencer 40 may decode the PKA command and may locate the corresponding sequence of subcommands (e.g. in a read-only memory (ROM) in the sequencer 40) (block 80). As mentioned previously, other embodiments may decode the command into subcommands in hardware, or a combination of ROM and hardware.

In some cases, a subcommand in the sequence may be performed by other secure peripherals 38B-38E. For example, in this embodiment, the RNG 36B or the authentication circuit 36C may perform some of the subcommands of some sequences. If the next command in the sequence uses the RNG 36 or the authentication circuit 36C (decision block 82, "yes" leg), the sequencer 40 may arbitrate for access to the RNG 36B or authentication circuit 36C (block 84). The arbitration may be, e.g., between the SEP processor 32 and the sequencer 40. Alternatively, the RNG 36B and/or authentication circuit 36C may include an input queue to receive commands, and the sequencer 40 may insert the subcommand into the input queue. In another alternative, the sequencer 40 may wait until the peripheral 36B-36C is free to insert the subcommand.

The sequencer 40 may transmit the command (to the PKA IP circuit 42 for PKA subcommands, or the RNG 36B/authentication circuit 36C for subcommand performed by those circuits) (block 86). The sequencer may wait for the command to complete (decision block 88) and may determine if the sequence is complete (decision block 90). If the sequence continues (decision block 90, "no" leg), the sequencer 40 may process the next subcommand (decision block 82, etc.).

If the sequence is complete (decision block 90, "yes" leg), the sequencer 40 may terminate the command with one or more subcommands to "clean up" after the command. For example, to further improve security since the private key 64 or values derived from the private key 64 may be stored in the PKA memory 44, there may be subcommands to overwrite the PKA memory 44 (or at least a portion thereof that was written during performance of the command) (block 92). The overwrite may be to write zeros, for example. Alternatively, ones may be written or any other pattern of values may be written. A subcommand may be performed to interrupt the SEP processor 32 to indicate that the command is complete (block 94).

The subcommands that make up each sequence may include subcommands to place the result in registers in the sequencer 40 so that the SEP processor 32 may collect the results, in an embodiment. Alternatively, the subcommands performed to "clean up" may include a subcommand or subcommands to place the results.

In the illustrated embodiment, the sequencer 40 may wait for each subcommand to complete before proceeding to the next subcommand. While this operation may simplify the sequencer 40, other embodiments need not wait. Subcommands may be pipeline and/or performed out of order, for example.

As mentioned above, the added security of the private key generated from hardware and protected by hardware may permit a stronger level of trust to be developed between the SOC 10 and other components or devices. Examples of such configurations are described in more detail below.

Figure 5:
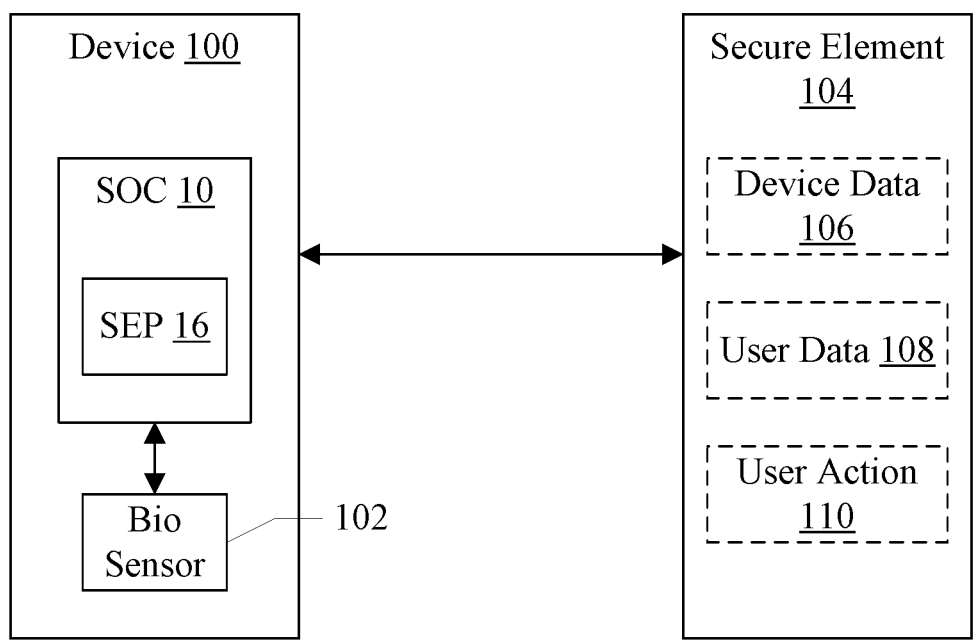
FIG. 5 is a block diagram of one embodiment of a device including the SOC shown in FIG. 1 and another secure element.

Turning next to FIG. 5, a block diagram of one embodiment of a device 100 that incorporates the SOC 10 (including the SEP 16) and a biometric sensor 102 (more briefly "bio sensor" 102) is shown. Another secure element (SE) 104 is also shown. In some embodiments, the SE 104 may store device data 106 and/or user data 108. The SE 104 may be configured to perform a user action 110, in some embodiments. The device 100 and the secure element 104 may be coupled through a variety of mechanisms. For example, the device 100 and the secure element 104 may be part of the same system (e.g. connected to each other in the same housing). The device 100 and the secure element 104 may also be separate systems. The systems may be coupled via be a wired connection such as a cable or a wired network, or via a wireless connection such as Bluetooth or a wireless network. Combinations of wired and wireless networks may be used. The network may be a local area network, a wide area network, the Internet, or any combination of a variety of networks.

Within the device 100, the SEP 16 may authenticate the SOC 10 to the sensor 102, "proving" that the SOC 10 is indeed present (not being mimicked by a nefarious third party) and a proper circuit with which the sensor 102 may communicate. Furthermore, the SEP 16 may authenticate the sensor 102 as being present (not mimicked) and a proper circuit to communicate with the SOC 10. The process of cross-authenticating may be referred to as "pairing." In general, the pairing of the SOC 10 and a sensor or other element of a device may be supported in a similar fashion.

The bio sensor 102 may be configured to detect biometric data for an authorized user. Biometric data may be data that uniquely identifies the user among humans (at least to a high degree of accuracy) based on the user's physical or behavioral characteristics. For example, biometric data may include fingerprint data previously captured from the user. The sensor may be configured to read the user's fingerprint and compare the read data to the previously-captured data. Alternatively, the sensor may provide the data to the SOC 10, which may also have the previously-captured data and may make the comparison. Other examples may include voice recognition (identifying the particular user's voice), iris scanning, etc.

The SEP 16 may also be configured to authenticate the device 100 to the secure element 104 (and may authenticate the secure element 104 as well). The secure element 104 may be any type of device. For example, the secure element 104 may be a server that stores device data 106 for the device 100. In a specific example, the device 100 may be a mobile device such as a smart phone, and the device data 106 may be the original factory settings for the device 100 or a previously saved image of the device 100. The device 100 may be restored to the factory settings/image after the device 100 has been verified. The device data 106 may further included device-specific data such as which pixels are bad in the camera on the device 100, data optimizations that have been developed for the specific camera, error corrections for other hardware in the device (e.g. memory redundancy settings), other device-specific optimizations, etc. The SE 104 may be a secure component in a system with the SOC 10 as well, in some embodiments.

User data 108 may be any data specific to the user detected by the biometric sensor 102. The SEP 16 may confirm the identity of the user to the secure element 104 based on the biometric sensor's detection of the user, and the secure element 104 may permit access to the user's data based on the SEP's confirmation and the trust relationship between the secure element 104 and the device 100. The user data 108 may be sensitive financial data, for example, such as account information, login information, etc. The user data 108 may be sensitive health data such as a universal health record. The user data 108 may be intellectual property (e.g. copyrighted works such as songs, literature, etc.) that the user has purchased and thus should be accessible to the user once authenticated.

The secure element 104 may also support a specific user action 110, which the secure element 104 may permit in response to the SEP 16 confirming to the user's identity. For example, the secure element 104 may not be capable of direct interaction with the user (e.g. it may have no direct user interface components), but the device 100 may operate as a surrogate for the secure element 104. In another embodiment, the secure element 104 may include user interface components, but may also support user interaction through the device 100.

Figure 6:
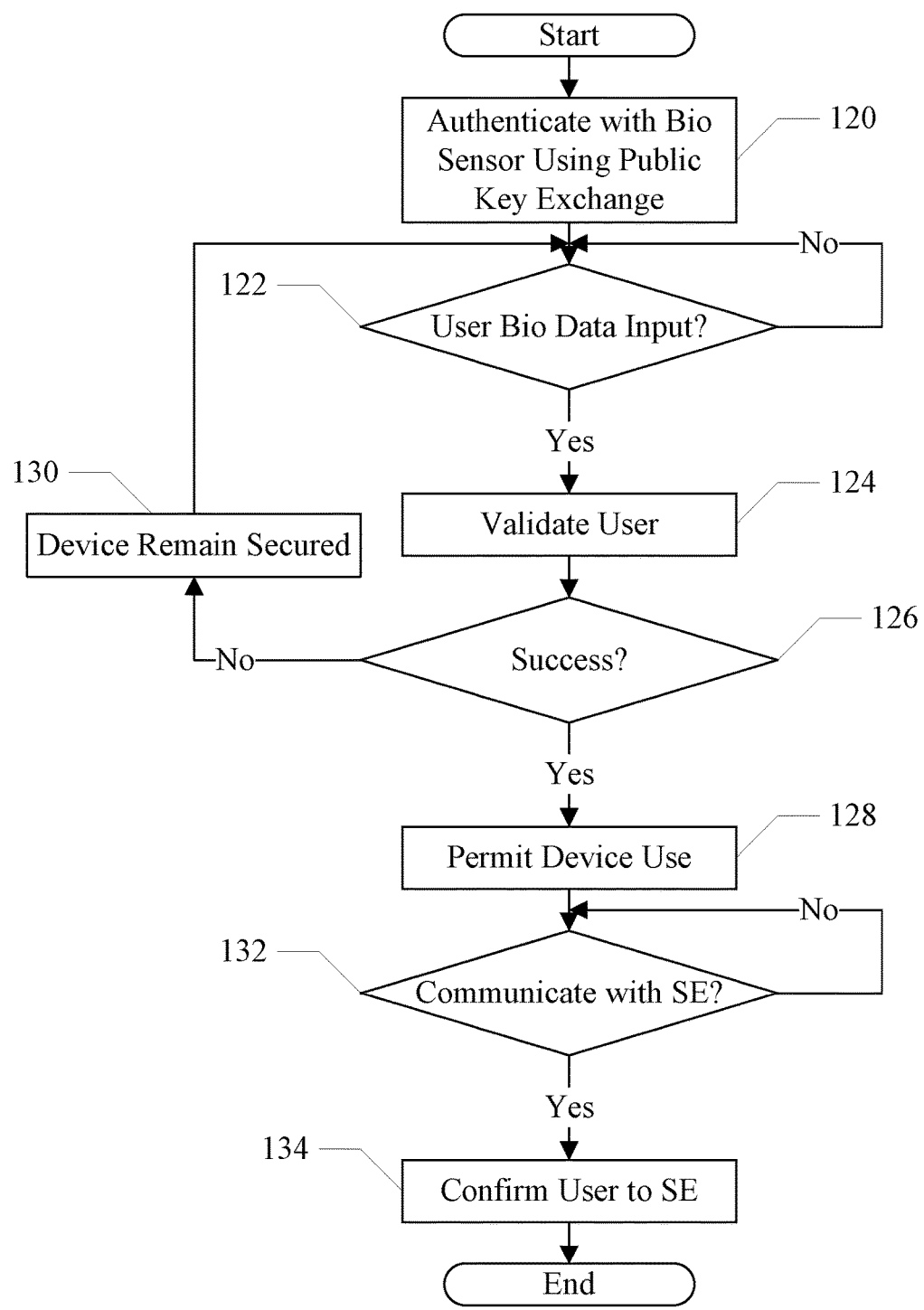
FIG. 6 is a flowchart illustrating operation of one embodiment of the device shown in FIG. 5.

FIG. 6 is a flowchart illustrating operation of one embodiment of the device 100 for various aspects discussed herein. While the blocks are shown in a particular order for ease of understanding, other orders may be used. Blocks implemented in hardware may be performed in parallel by combinatorial logic within the hardware. Blocks, combinations of blocks, and/or the flowchart as a whole may be pipelined over multiple clock cycles. The device 100 may be configured to implement the operation shown in FIG. 6.

The SEP 16 may authenticate with the bio sensor 102 (block 120). The authentication may be performed via public key exchange, digital signature verification, shared secret creation, etc. If user data is input to the bio sensor 102 (decision block 122, "yes" leg), the device 100 may validate the user (block 124). If the user is successfully validated (decision block 126, "yes" leg), the device 100 may permit user to use the device (block 128). If the user is not validated (decision block 126, "no" leg), the user may not be the user who is permitted to use the device. Accordingly, the device 100 may remain secured (block 130). In the secured state, the user may have no access to the device, or may have only access that is deemed in the design of the device to be non-sensitive. For example, if the device 100 is a smart phone and receives a call, the device may permit the call to be answered without requiring user validation. However, most of the devices function may only be accessible with user validation. A device may remain secured if the device's functions are not available to the user (potentially with exceptions such as the aforementioned phone call). A secured device may be referred to as "locked." In some cases, the user validation may include matching the biometric data as well as other security checks (e.g. requiring a password or pin from the user).

If the device 100 is to communicate with another secure element, such as the secure element 104, after the device 100 has validated the user (decision block 132, "yes" leg), the SEP 16 may confirm the identity of the user in the communication with the secure element 104 (block 134) when requested. The device 100 may request that the user identify himself/herself again with the biometric sensor 102 and/or other control measures such as a password. The re-verification before confirmation may help ensure that the previously-validated user is still in control of the device 100.

Figure 7:
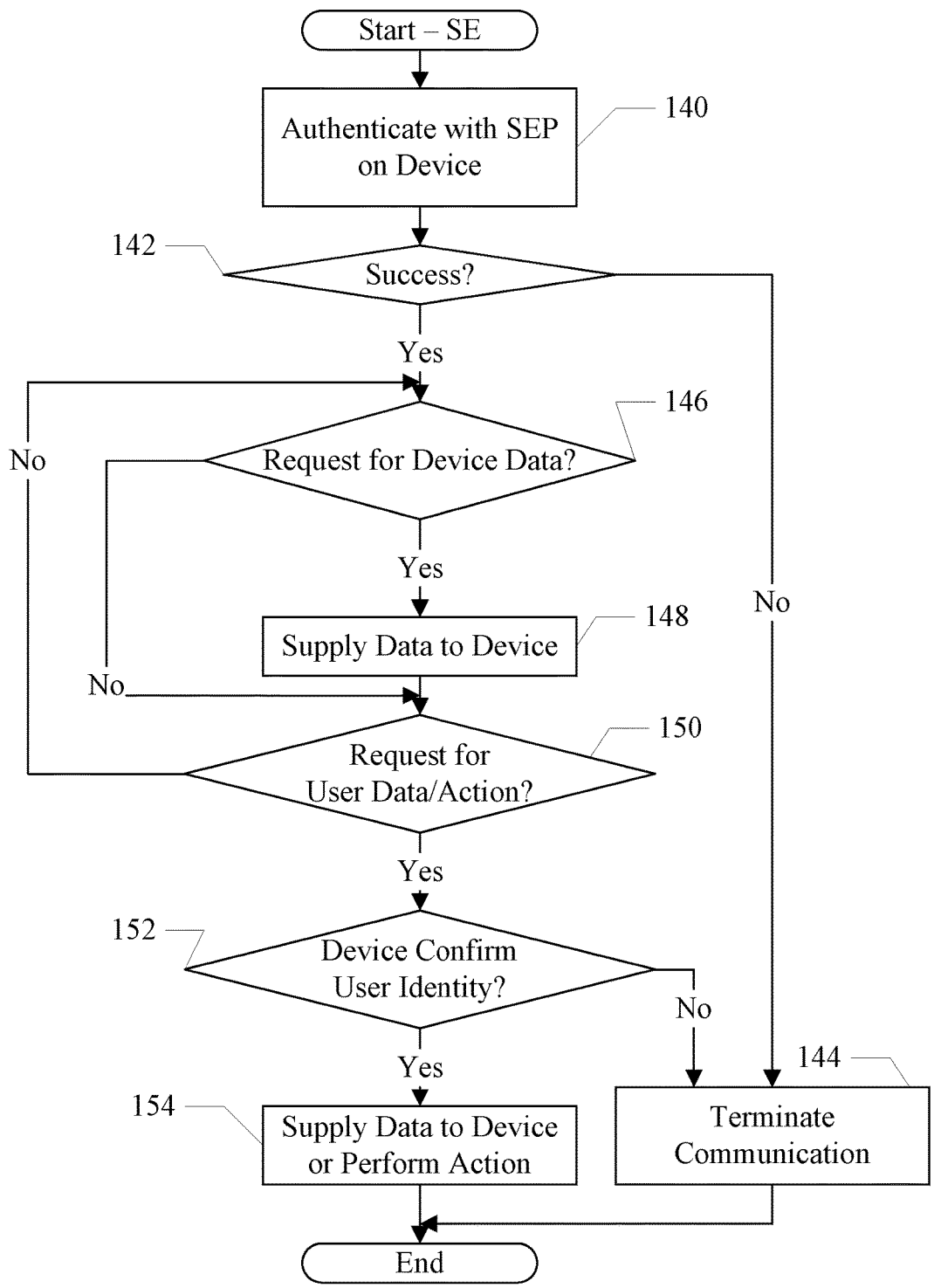
FIG. 7 is a flowchart illustrating operation of one embodiment of a secure element in FIG. 5.

FIG. 7 is a flowchart illustrating operation of one embodiment of the secure element 104 for communicating with the device 100. While the blocks are shown in a particular order for ease of understanding, other orders may be used. Blocks implemented in hardware may be performed in parallel by combinatorial logic within the hardware. Blocks, combinations of blocks, and/or the flowchart as a whole may be pipelined over multiple clock cycles. The secure element 104 may be configured to implement the operation shown in FIG. 7.

The secure element 104 may authenticate with the SEP 16 on the device 100 (block 140). If the secure element 104 includes another instance of the SOC 10, the authentication may be SEP to SEP. For example, the secure element 104 may be another instance of the device 100. If the authentication is not successful, the secure element 104 may terminate communication with the device 100 (decision block 142, "no" leg and block 144). On the other hand, if the authentication is successful (decision block 142, "yes" leg), then interaction between the device 100 and the secure element 104 may be permitted. For example, the device 100 may make a request for the device data 106 (decision block 146, "yes" leg). If so, the secure element 104 may provide the data (block 148). The request for device data may be made because the device 100 is being reinitialized (e.g. to factory settings) or data is being recovered after a reset of the device, for example.

Additionally, the secure element 104 may receive a request from the device 100 for user data 108 or a user action 110 (decision block 150, "yes" leg). If so, the secure element 104 may request that the device 100 confirm the identity of the user (decision block 152). If the device 100 does not confirm the identity of the user (decision block 152, "no" leg), the secure element 104 may terminate communication with the device 100 (block 144). If the device 100 does confirm the identity of the user (decision block 152, "yes" leg), the secure element 104 may supply the data or perform the action (block 154). Alternatively, the secure element 104 may reject the attempt to access the user data 108 or perform the user action 110 if the device 100 does not confirm the identity of the user, but may not terminate communication with the device 100.

Figure 8:
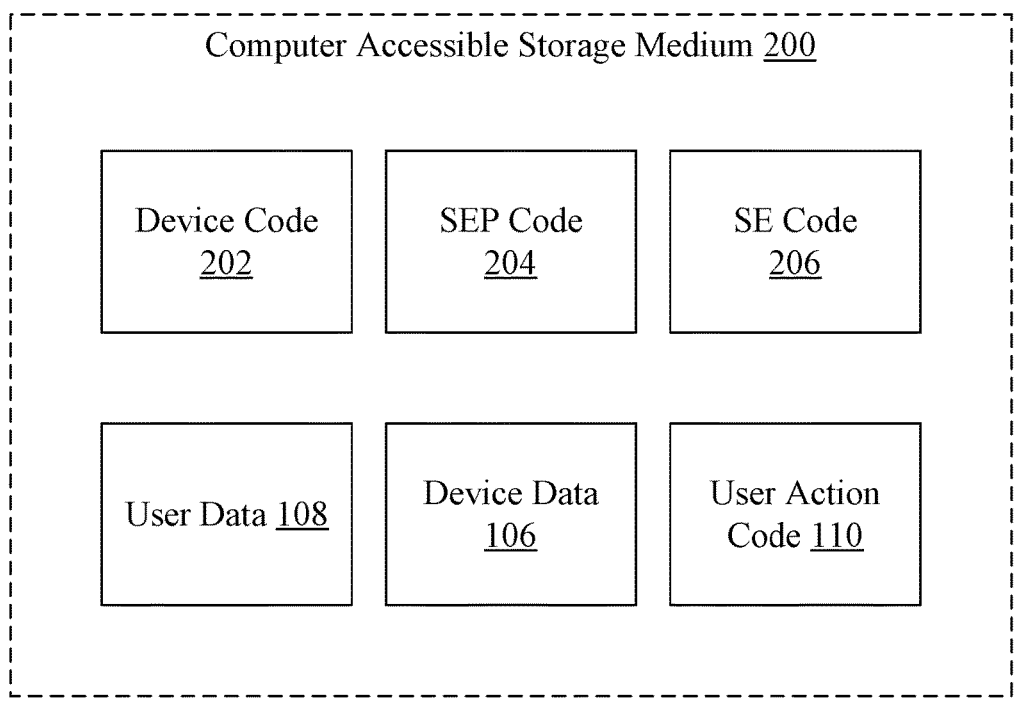
FIG. 8 is a block diagram of a computer accessible storage medium.

FIG. 8 is a block diagram of one embodiment of a computer accessible storage medium 200. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 8 may store code forming one or more of device code 202, SEP code 204, SE code 206, and/or user action code 110. The computer accessible storage medium 200 may still further store one or more of the user data 108 and/or the device data 106. The device code 202 may be code executable on the device 100 (e.g. on the CPU processors 30 in the SOC 10), including code that implements all or a portion of the flowchart shown in FIG. 6 (except those portions executed within the SEP 16). The SEP code 204 may include code executable in the SEP 16, such as code executable on the SEP processor 32. The SEP code 16 may include code that implements portions of FIG. 6 assigned to the SEP 16, and/or all or a portion of FIG. 3. The SE code 206 may include code executable on the SE 104 such as code implementing all or a portion of FIG. 7. The user action code 110 may implement permitted user actions when executed on the SE 104 (e.g. block 154 in FIG. 7). A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A system comprising:
   a secure element configured to store user information specific to a user and device data specific to a device; and
   a device enclosed in a separate housing from the secure element and coupled to the secure element via a network to communicate with the secure element, wherein:
   the device comprises a security circuit;
   the security circuit includes a first private key of one or more cryptographic public key/private key pairs;
   the first private key is inaccessible to instructions executed in the device;
   the security circuit is configured to authenticate the device with the secure element using the first private key, wherein the secure element is configured to permit the device to access the device data responsive to authenticating the device;
   the security circuit is configured to authenticate the user using the first private key; and
   the device is configured to confirm an identity of the user to the secure element responsive to authenticating the user.

2. The system as recited in claim 1 wherein the device comprises a first instance of a system on a chip (SOC) that comprises the security circuit, and wherein the secure element comprises a second instance of the SOC, and wherein the security circuits on the first instance and the second instance of the SOC cooperate in authenticating the device to the secure element.

3. The system as recited in claim 2 wherein the secure element comprises another instance of the device.

4. The system as recited in claim 1 wherein the secure element is configured to terminate communication with the device responsive to a failure to authenticate the device.

5. The system as recited in claim 1 wherein the device data comprises an image of first data captured from the device at a previous point in time, and wherein the device is configured to access the device data to recover from a reset of the device.

6. The system as recited in claim 5 wherein the image comprises a factory image captured at manufacture of the device and used to reinitialize the device to factory settings.

7. The system as recited in claim 1 wherein the user information comprises user data that is private to the user.

8. The system as recited in claim 1 wherein the user information comprises a user action that the secure element is configured to perform on behalf of the user in response to a request by the user and confirmation of the user's identity by the device.

9. The system as recited in claim 1 wherein the device data comprises data-specific hardware data.

10. The system as recited in claim 9 wherein the device-specific hardware data comprises an indication of which pixels in a camera in the device do not function.

11. The system as recited in claim 9 wherein the device-specific hardware data comprises data optimization for a camera in the device.

12. The system as recited in claim 9 wherein the device-specific hardware data comprises error correction data for hardware in the device.

13. A device comprising a system on a chip, wherein the system on a chip comprises:
a plurality of processors forming a central processing unit (CPU) of the device;
a security circuit coupled to the plurality of processors, wherein:
the security circuit contains a first private key of one or more cryptographic public key/private key pairs;
the first private key is inaccessible to instructions executed within the device, including instructions executed on the plurality of processors;
the security circuit is configured to authenticate the device with a secure element that is external to the device and coupled to the device via a network, wherein the security circuit is configured to authenticate the device using the first private key, and the secure element is configured to permit the device to access device data stored in the secure element responsive to authenticating the device;
the security circuit is configured to authenticate a user of the device using the first private key; and
the device is configured to confirm an identity of the user to the secure element responsive to authenticating the user.

14. The device as recited in claim 13 wherein the device data comprises an image of first data captured from the device at a previous point in time, and wherein the device is configured to access the device data to recover from a reset of the device.

15. The device as recited in claim 14 wherein the image comprises a factory image captured at manufacture of the device and used to reinitialize the device to factory settings.

16. The device as recited in claim 13 wherein the user information comprises user data that is private to the user.

17. The device as recited in claim 13 wherein the user information comprises a user action that the secure element is configured to perform on behalf of the user in response to a request by the user and confirmation of the user's identity by the device.

18. The device as recited in claim 13 wherein the device data comprises data-specific hardware data.

19. A method comprising, in a device comprising a system on a chip, wherein the system on a chip comprises a plurality of processors forming a central processing unit (CPU) of the device and a security circuit coupled to the plurality of processors, wherein the security circuit contains a first private key of one or more cryptographic public key/private key pairs, wherein the first private key is inaccessible to instructions executed within the device, including instructions executed on the plurality of processors:
authenticating the device with a secure element that is external to the device and coupled the device via a network, the authenticating performed by the security circuit using the first private key;
accessing device data specific to the device that is stored on the secure element responsive to authenticating the device, the accessing performed by the device and independent of a user of the device;
authenticating the user by the security circuit using the first private key;
confirming an identity of the user to the secure element responsive to authenticating the user; and
accessing user information stored on the secure element and specific to the user responsive to a user request entered on the device by the user.

20. The method as recited in claim 19 wherein the device data comprises an image of first data captured from the device at a previous point in time, and the method further comprising:
resetting the device, wherein resetting the device includes deleting device data from the device;
accessing the device data by the device to obtain the image; and
storing the image on the device recover from the resetting of the device.

* * * * *